July 28, 1942.　　L. H. HEINICHEN　　2,291,550
MACHINE TOOL
Filed April 12, 1939　　2 Sheets-Sheet 2
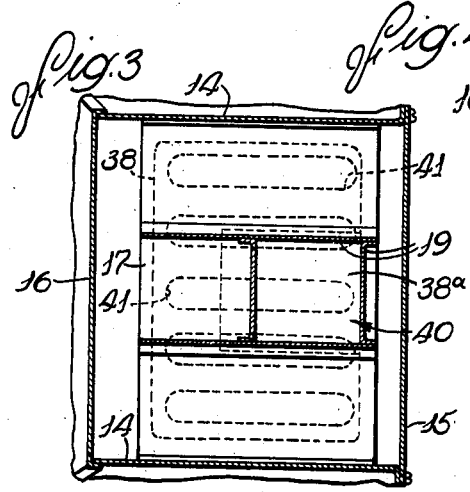
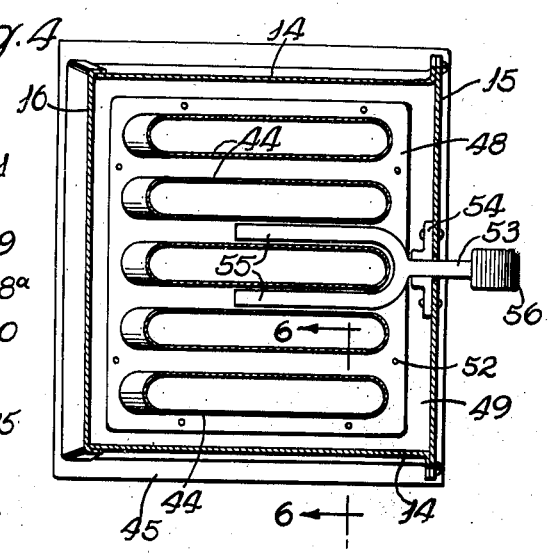
INVENTOR
Luther H. Heinichen
By Parker, Carlson, Pitzner & Hubbard
ATTORNEYS Patented July 28, 1942

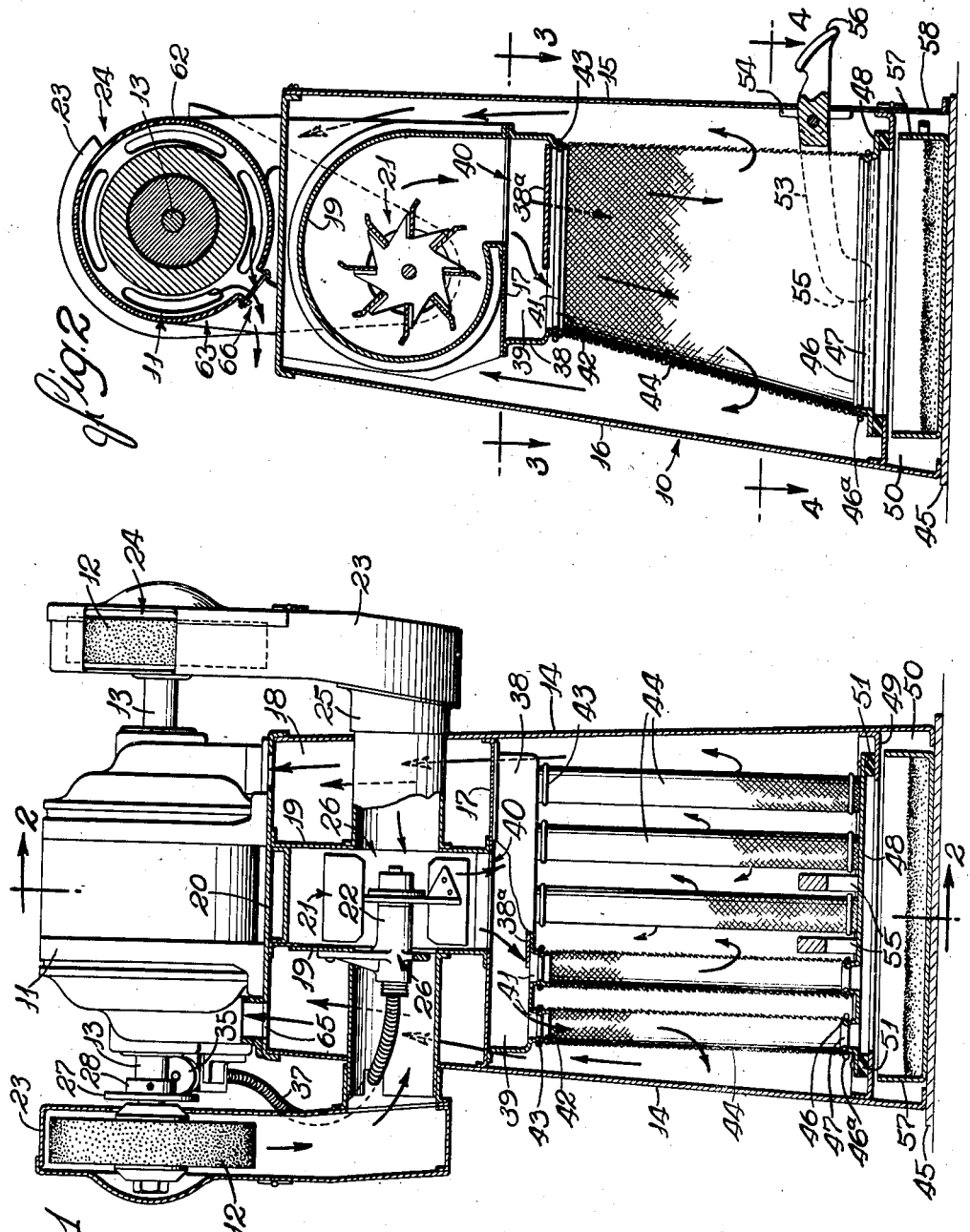

2,291,550

UNITED STATES PATENT OFFICE 2,291,550

MACHINE TOOL

Luther H. Heinichen, Chicago, Ill.

Application April 12, 1939, Serial No. 267,379

5 Claims. (Cl. 51—273)

The invention relates to machine tools and more particularly to tools embodying grinding, abrading or like means that in operation create quantities of relatively fine particles of material.

An object of the invention is to provide a machine tool of this character which embodies as a part of the machine new and improved means for removing such particles from the atmosphere about their zone of creation and for subsequently separating and collecting the particles in a concealed, out-of-the-way part of the machine.

Another object is to provide in a grinding, abrading or like machine tool having one or more motor driven cutting devices, novel means for creating a flow of air through the zone about such devices for withdrawing material particles and for causing the air flow to pass through particle separating or filtering means housed in the machine and thence through the driving motor as a cooling flow of clean, dust-free air.

Other objects and advantages will become apparent in the following description and from the accompanying drawings, in which:

Figure 1 is a front view of a machine tool embodying the features of the invention and the view is partially in vertical section to illustrate the internal construction.

Fig. 2 is a vertical sectional view through the machine taken along the line 2—2 of Fig. 1.

Figs. 3 and 4 are horizontal sectional views taken respectively through the machine on the lines 3—3 and 4—4 of Fig. 2.

Fig. 5 illustrates on an enlarged scale a detail of the driving mechanism for the blower.

Fig. 6 is an enlarged sectional view taken along the line 6—6 of Fig. 4 and illustrates a detail of assembly of the air filtering means.

Fig. 7 is a sectional view taken through the motor assembly substantially on a vertical axial plane.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The exemplary form of machine tool which has been selected for illustrative purposes is a unitary motor driven grinder embodying two grinding wheels or disks. It is to be understood, however, that a grinder has been selected as being representative of machine tools such as lapping machines, buffing machines and sanding machines which are characterized in that a considerable quantity of fine dust-like particles of material are produced as an incident to the operation thereof. The invention moreover is applicable to machines having only a single abrading, cutting or work performing element.

Referring particularly to Fig. 1 of the drawings, the present machine includes in its general organization an upright supporting base or pedestal 10 upon which is mounted a driving motor 11 for the grinding wheels 12, these wheels, in this instance, being mounted on opposite ends of the armature shaft 13 of the motor. The pedestal is preferably fashioned to provide a hollow interior of substantial dimensions. Extending between the side walls 14 of the pedestal and in spaced relation to the front wall 15 and rear wall 16 is an upper transverse supporting member 17 defining a blower compartment 18 in the upper portion of the pedestal. Within the blower compartment, and in this instance located centrally thereof, is a blower casing 19 secured between the top wall 20 of the pedestal and the upper support 17. An air flow creating means, such as the fan 21, is journaled on a bearing bracket 22 for rotation within the blower casing.

Each grinding wheel 12, or other work performing element, is substantially enclosed by a hood 23 having an access opening 24. Each hood is vertically elongated and communicates through its lower end with a horizontal duct 25 that extends through the adjacent side wall of the pedestal and is connected with an axial opening 26 in the blower casing 19. The openings 26 represent the inlets to the fan.

The fan may be driven in any suitable manner and in the present instance, as shown in Figs. 1 and 5, is operated by a power take-off from the motor shaft. To this end, a driving disk 27 is secured through its hub 28 to the motor shaft 13. A fixed part of the motor casing, indicated at 29 (Fig. 5) supports a bracket 30 having a bearing member 31 pivotally affixed thereto, as at 32. A shaft 33 is journaled through antifriction bearings 34 in the bearing member and at one end carries a friction disk 35 disposed for engagement with the driving disk 27. Such means as a spring 36 interposed between the bearing member 31 and the bracket 30 yieldingly urges the friction disk against the driving disk. The other end of the shaft 33 is connected in any suitable manner with a conventional flexible drive shaft which is not shown but is mounted in a protecting sheathing 37 (Fig. 1). The flexible drive shaft leads into the pedestal for connection with the fan.

By this arrangement, whenever the grinding wheels 12 are driven the fan 21 is also driven to create a draft of air flowing into the hoods through the access openings thereof. These openings approximately define the zone about the grinding wheel in which the material particles are created during the operation of the machine. As a result, all such particles will be entrained by the air flow and drawn through the hoods and the conduits 25 into the blower casing.

Means is provided in the pedestal below the upper support 17 for separating and collecting all of the particles entrained in the air stream. As shown in Figs. 1 and 2, the upper support 17 has secured to its lower side a header 38 which forms a compartment 39 having access to the blower casing 19 through an outlet 40 formed peripherally on the blower casing and in registry with an opening in the upper support 17. The bottom or lower wall of the header 38 has a series of elongated, relatively narrow openings 41 therein defined by downwardly extending flanges 42. Secured to each flange by such means as a clamping ring 43 is one end of an air filter 44. As shown, the air filters are elongated, tubular, sleeve-like members preferably fashioned of a flexible coarse material, such as woven fiber glass cloth, asbestos cloth, fine wire mesh, or the like, having fire-proof qualities, but where a fire hazard is not a factor to be taken into consideration other porous filtering materials will operate satisfactorily.

The filter sleeves depend from the header 38 and terminate a short distance above the bottom wall 45 of the pedestal. The lower end of each filter member is secured by a clamping ring 46a to a flange 46 which defines an aperture 47 in a horizontally disposed plate 48. The plate rests on a horizontal lower support 49 extending peripherally inwardly from the walls of the pedestal and preferably has a substantially air sealed relationship therewith to form a dead air chamber 50 in the lower portion of the pedestal. Hence, particle laden air that is discharged by the fan into the header compartment 39 through the fan outlet 40 will flow downwardly into the filtering members and, since the lower ends of the members communicate with the dead air space, the flowing air passes outwardly through the side walls of the filter members into the interior of the pedestal surrounding the members. The path of flow is indicated in Figs. 1 and 2 by the arrows. Accumulations of dust particles dislodged from the inner walls of the filter members from time to time will fall through the lower open ends of the members into the dead air chamber 50. To effect an even distribution of particle laden air to the filter members, a baffle plate 38a (Figs. 1 and 2) may be mounted in the header immediately under the outlet 40 from the blower casing.

Means may be provided for manipulation by the operator to dislodge the particles from the filter members. In the present instance, the plate 48, to which the lower ends of the filter members are secured, is sealed to the lower support 49 by an interposed continuous strip 51 of flexible resilient material, such as rubber. Limited movement of the plate 48 relative to the lower support 49 is permitted by such means as a series of relatively loose and detachable connections 52 (Figs. 4 and 6). A lever 53 (Figs. 2 and 4) extends through the front wall 15 of the pedestal and is pivotally supported thereon by a bracket 54. The inner end of the lever is bifurcated to straddle an intermediate filter member and each end of the bifurcation terminates in an enlarged head 55 (Figs. 1 and 2). The outer or exposed end of the lever is fashioned as a foot treadle 56 by which the operator of the machine may raise the enlarged heads 55 and then allow them to drop against the plate 48. The resulting movement of the plate 48 is transmitted to the filter members as vibrations which free accumulations of dust particles from the filter members. Particles falling into the dead air chamber may be conveniently collected in a receptacle 57 located therein and removable through a door 58 in the front wall of the pedestal. Preferably, the entire front wall is detachable to permit inspection of the mechanism mounted within the interior of the pedestal. Suitable sealing means for the front wall 15, and particularly for the door 58, is of course provided since the pedestal should be air tight.

A feature of the invention is in the provision of means for utilizing the clean, filtered air for cooling the driving motor. Referring to Fig. 7, the motor is of generally conventional type having a field winding 59 enclosing an armature 60 on the shaft 13. The ends of the housing are sealed by shells 61 secured to an intermediate section of the motor housing 62 and to the motor base 63. At each end, the motor base has a port 64 which communicates with the interior of the pedestal through apertures 65 in the top wall 20. The ports 64 provide air inlets to the motor housing and an air outlet 66 is formed in the intermediate housing section 62 at the rear thereof (see Fig. 2).

As may be seen in Figs. 1 to 4, inclusive, the blower casing, the ducts leading thereto, and the air filtering means are all spaced from the walls of the pedestal so that in operation the clean air issuing from the filters may, as indicated by the arrows, pass upwardly within the pedestal and into the motor housing through the inlet ports 64. Baffle means 67 in the motor housing may be provided to insure that the air flow will pass over and about all parts of the armature and the field winding before escaping to atmosphere through the outlet port 66. Thus, the motor will be thoroughly and effectively cooled by a forced draft of dust-free air, thereby increasing the permissive load capacity of the motor and preventing the undesirable accumulation therein of material particles.

It will be evident from the foregoing that a novel machine tool has been provided which is a unitary structure embodying its own dust and particle collecting system including an efficient and novel means for filtering and cleaning the particle laden air. The present invention obviates the need of extensive and expensive exhaust system installations serving a number of machines and provides a complete structure which occupies approximately the same floor space area as does a conventional machine of the same character. In addition, the forced flow of thoroughly clean air through the motor will cool the motor more effectively than is possible by the flow of air resulting solely from motor operation and at the same time the motor is sealed against the entrance of foreign matter.

I claim as my invention:

1. A machine tool having, in combination, a hollow pedestal of substantial internal dimensions, a motor on said pedestal having a sealed enclosing housing provided with an air inlet opening into the interior of said pedestal and an outlet to atmosphere, work performing means driven by said motor, spaced supporting means in the upper and lower parts of said pedestal, blower means in said pedestal above the upper supporting means having driving connections with said motor, a hood partially enclosing said work performing means and communicating with the intake of said blower, header means on said upper supporting means forming a closed compartment, an air flow connection between the outlet from said blower means and said compartment, a transverse plate carried by the lower supporting means, and tubular filtering means communicating with said compartment and opening through said plate, the interior of said pedestal about said filtering means being in communication with the air inlet to the sealed motor casing.

2. A machine tool having, in combination, a device adapted to remove surface material from a work piece, a substantially hollow supporting pedestal for said device, a driving motor for said device on said pedestal including a sealed housing having air inlet and outlet openings, a plurality of elongated tubular members in said pedestal formed of a material capable of removing particles from air passed therethrough, an air flow creating means, an air conduit having an open mouth disposed adjacent to said device and connected with said flow creating means for withdrawing material particles resulting from the operation of said device, means for causing particle laden air to pass into the ends of said members and thence through the side walls thereof into the space in the pedestal surrounding said members, and means for directing a flow of air from said space into the inlet of the motor housing to cool the motor and thence discharge to atmosphere through the outlet therefrom.

3. In a machine tool having a device adapted to remove surface material from a work piece, the combination of a substantially hollow member, a driving motor for said device on said member including a sealed housing having an air inlet opening into the interior of said hollow member and an outlet to the atmosphere, a plurality of elongated tubular sleeves formed of a material capable of removing particles from air passed therethrough, means supporting said sleeves vertically in said member, air flow creating means driven by said motor, an air conduit having an open mouth connected with said flow creating means to create an air flow for withdrawing material particles resulting from the operation of said device, passageways for directing the flow of particle laden air downwardly into the upper ends of said sleeves, and means defining a dead air chamber in the lower portion of said member for causing the particle laden air to pass through the side walls of said sleeves to the interior of said member and thence through said housing to cool said motor.

4. A machine tool having, in combination, a pedestal, a cutting device mounted on said pedestal, a driving motor for said device, means in said pedestal for creating a flow of air and including air conducting means affording communication between the intake thereof and the zone about said cutting device to entrain and remove from said zone particles of material resulting form the operation of said device, air conducting means leading away from the outlet of the flow creating means to discharge through and in cooling relation to said motor, and air filtering means in said pedestal interposed in the last mentioned air conducting means ahead of said motor for removing material particles from the air.

5. In a device of the character described, having cutting means which in operation produces fine material particles, the combination of air flow creating means, a motor having driving connections with said cutting means and with said air flow creating means, air conducting means communicating between the intake of said flow creating means and the zone about said cutting means, air conducting means leading away from the outlet of said flow creating means to discharge through and in cooling relation to said motor, and air filtering means interposed in the last mentioned air conducting means ahead of said motor for removing material particles from the air.

LUTHER H. HEINICHEN.